(12) United States Patent
Hara

(10) Patent No.: US 7,072,866 B1
(45) Date of Patent: Jul. 4, 2006

(54) CHARGE CALCULATION APPARATUS AND METHOD

(75) Inventor: Hiroyuki Hara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 178 days.

(21) Appl. No.: 09/648,870

(22) Filed: Aug. 25, 2000

(30) Foreign Application Priority Data

Aug. 26, 1999 (JP) ................................. 11-239819

(51) Int. Cl.
  *G06F 17/00* (2006.01)
(52) U.S. Cl. ......................................... 705/52; 705/53
(58) Field of Classification Search ................. 705/21, 705/26, 51, 23, 52, 53
  See application file for complete search history.

(56) References Cited

U.S. PATENT DOCUMENTS

| 6,078,899 | A  | * | 6/2000  | Francisco et al. .............. 705/19 |
| 6,108,638 | A  | * | 8/2000  | Sato et al. ..................... 705/21 |
| 6,208,428 | B1 | * | 3/2001  | Chihara et al. ............. 358/1.15 |
| 6,289,314 | B1 | * | 9/2001  | Matsuzaki et al. .............. 705/1 |
| 6,434,709 | B1 | * | 8/2002  | Ito et al. ...................... 713/502 |
| 6,438,233 | B1 | * | 8/2002  | Yoshimune et al. ......... 380/241 |
| 6,463,539 | B1 | * | 10/2002 | Mochizuki .................. 713/193 |

FOREIGN PATENT DOCUMENTS

JP 02000207198 A * 7/2000

* cited by examiner

*Primary Examiner*—Elisca Pierre Eddy
(74) *Attorney, Agent, or Firm*—Cowan, Liebowitz & Latman, P.C.

(57) ABSTRACT

The charge for application software used to input/output data is calculated independently of the charge for a device used to input/output the data, thereby flexibly charging for data input/output.

12 Claims, 5 Drawing Sheets

CHARGE CALCULATION APPARATUS AND METHOD

FIELD OF THE INVENTION

The present invention relates to a charge calculation method and apparatus capable of calculating the charge for application software independently of the charge for an apparatus.

BACKGROUND OF THE INVENTION

Conventionally, when a user has input or output document data using an input/output device such as a scanner or printer, the user is charged for use of the device.

In this conventional charge scheme, the number of pages of input/output document data is counted in units of input/output devices used for input/output, and the user is uniformly charged using the count information.

Generally, a variety of software for document editing or document input/output are available at different costs.

For example, when a document is output, its style changes depending on the software used. In addition, some software cannot process full-color data but can process only, e.g., 256 (pseudo) colors.

In the prior art, however, the user is charged using only the count information of each input/output device. For this reason, when the numbers of input/output pages equal, the charges also equal independently of the type and quality of the software used.

SUMMARY OF THE INVENTION

It is an object of the present invention to provide a more appropriate charge system which charges for not only use of a device but also for the used application software.

It is another object of the present invention to calculate the charges for not only application software stored in a computer but also various application software distributed through a network independently of the charge for the device.

In order to achieve the above objects, according to the present invention, there is provided a charge calculation apparatus comprising data processing means for creating and/or editing data using application software, input/output means for inputting or outputting data using a data input/output device connected to the charge calculation apparatus or a data input/output device connected through a network, and calculation means for calculating a charge for the data input/output device, or a charge for the application software independently of the charge for the data input/output device.

There is also provided a charge calculation apparatus comprising first calculation means for calculating a charge for a device for inputting or outputting data, and second calculation means for calculating a charge for application software used to use the device.

There is also provided a charge calculation method comprising the data processing step of creating and/or editing data using application software, the input/output step of inputting or outputting data using a data input/output device connected to the charge calculation apparatus or a data input/output device connected through a network, and the calculation step of calculating a charge for the data input/output device, or a charge for the application software independently of the charge for the data input/output device.

There is also provided a charge calculation method comprising the first calculation step of calculating a charge for a device for inputting or outputting data, and the second calculation step of calculating a charge for application software used to use the device.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS (First Embodiment)

An embodiment of the present invention will be described below in detail with reference to the accompanying drawings.

In the first embodiment, charge processing for printing using a printing apparatus connected to a computer directly or through a network, and charge processing for application software used for printing will be described.

Figure 1:
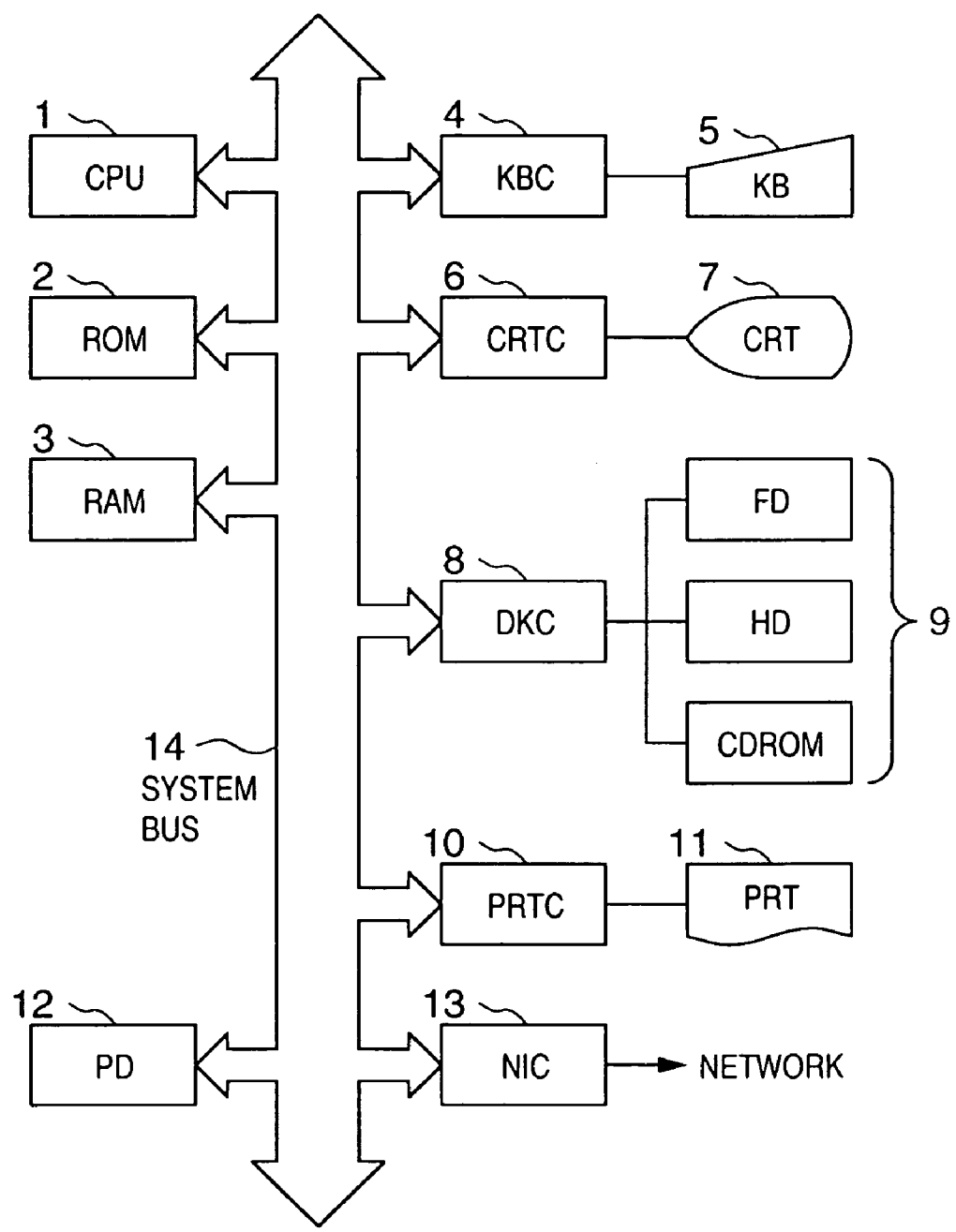
FIG. 1 is a block diagram showing the arrangement of an information processing system used in the first embodiment of the present invention.

FIG. 1 is a block diagram showing the basic arrangement of an information processing system according to this embodiment. This system may be either a system such as a workstation or personal computer or a work processor capable of loading additional software.

Referring to FIG. 1, a CPU (Central Processing Unit) controls the entire apparatus and performs arithmetic processing in accordance with a program stored in a ROM (Read Only Memory) 2 (to be described later). The ROM 2 stores a system activation program and graphic patterns/data. A RAM (Random Access Memory) 3 temporarily stores data used for calculation by the CPU 1 and a calculation result from the CPU 1.

A keyboard control section (KBC) 4 respectively key input data (character code or control code) from a keyboard (KB) 5 and transmits the data to the CPU 1.

A display control section (CRTC) 6 reads out display information stored in the RAM 3, i.e., a bitmap image converted from a character code and transfers the data to a display device (CRT) (to be described later). A display device (CRT) 7 receives the bitmap image from the display control section (CRTC) 6 and displays the image on the display screen.

A disk control section (DKC) 8 controls data transmission to an external storage device 9 (to be described later). The external storage device 9 is formed from a floppy disk device (FD), hard disk device (HD), or CD-ROM. The external storage device 9 stores programs and data. The CPU 1 refers to the stored data or loads it to the RAM 3, as needed.

A printer control section (PRTC) 10 controls the operation of a printer (PRT) 11.

A pointing device (PD) 12 receives coordinate data and sends them to the CPU 1.

A network interface card (NIC) 13 transmits/receives data through a network such as a LAN or intranet.

A system bus 14 perform data transfer between the above-described components.

Figure 2:
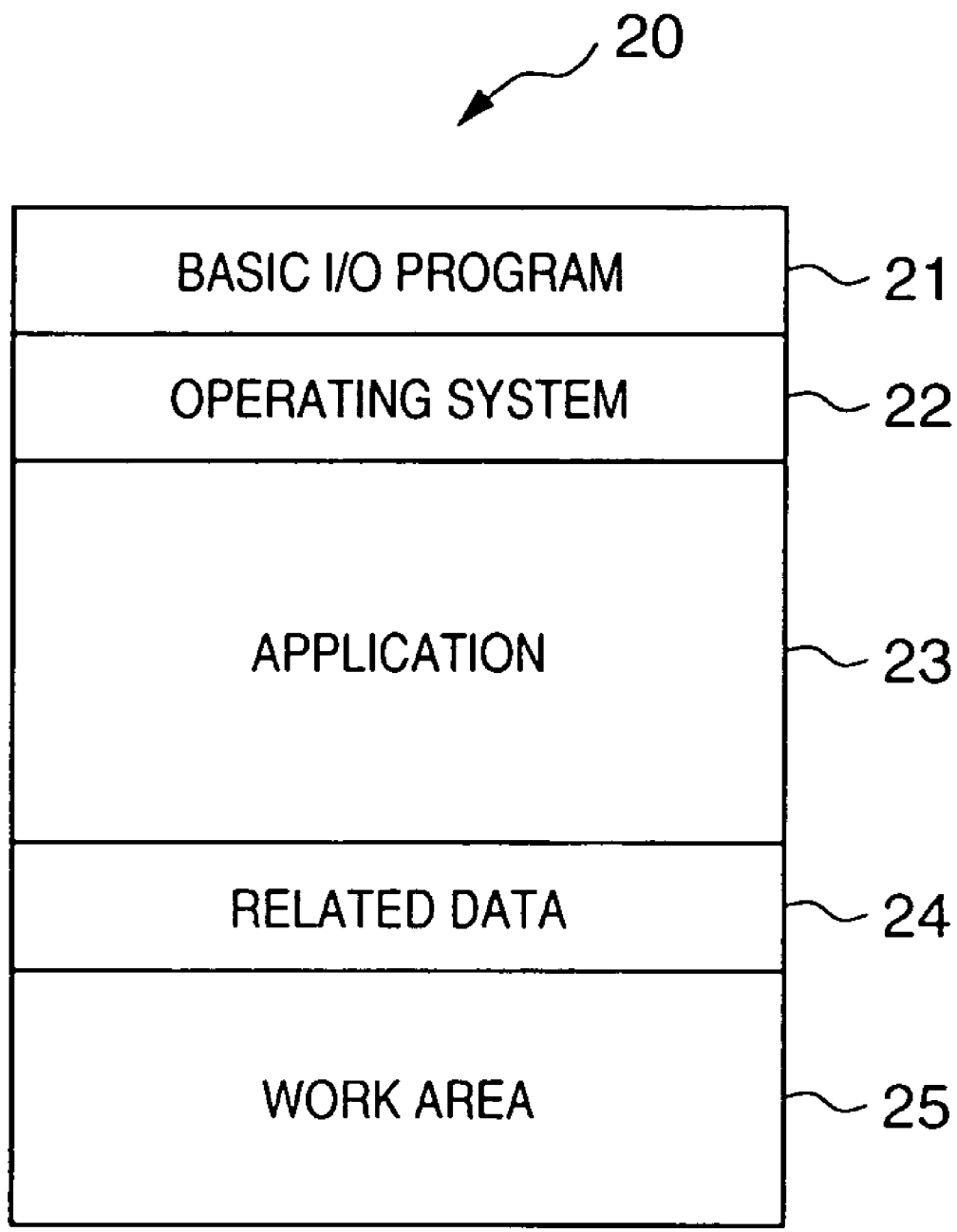
FIG. 2 is a view showing the memory map of the information processing apparatus according to the first embodiment of the present invention.

FIG. 2 is a view showing the arrangement of a memory map 20 in the overall processing of the document charge system according to the first embodiment shown in FIG. 1. Referring to FIG. 2, reference numeral 21 denotes a basic I/O program; 22, a memory map in which an operating system such as the Windows operating system 13 is loaded in the RAM 3 and becomes executable; 23, a memory map in which the program of this embodiment is loaded in the RAM 3 and becomes executable; 24, a memory map in which related data is loaded in the RAM 3 and becomes executable; and 25, a memory map of a work memory used by each program.

This apparatus operates when the basic I/O program 21, operating system 22 such as the Windows operating system, and the application 23 as the processing of this embodiment are executed by the CPU 1. The basic I/O program 21 is stored in the ROM 2 shown in FIG. 1. The operating system 22 is stored in the hard disk device (HD) shown in FIG. 1. When this apparatus is turned on, the operating system 22 is loaded from the head disk device (HD) to the RAM 3 by the IPL (Initialize Program Loading) function in the basic I/O program 21, and the operation starts.

Figure 3:
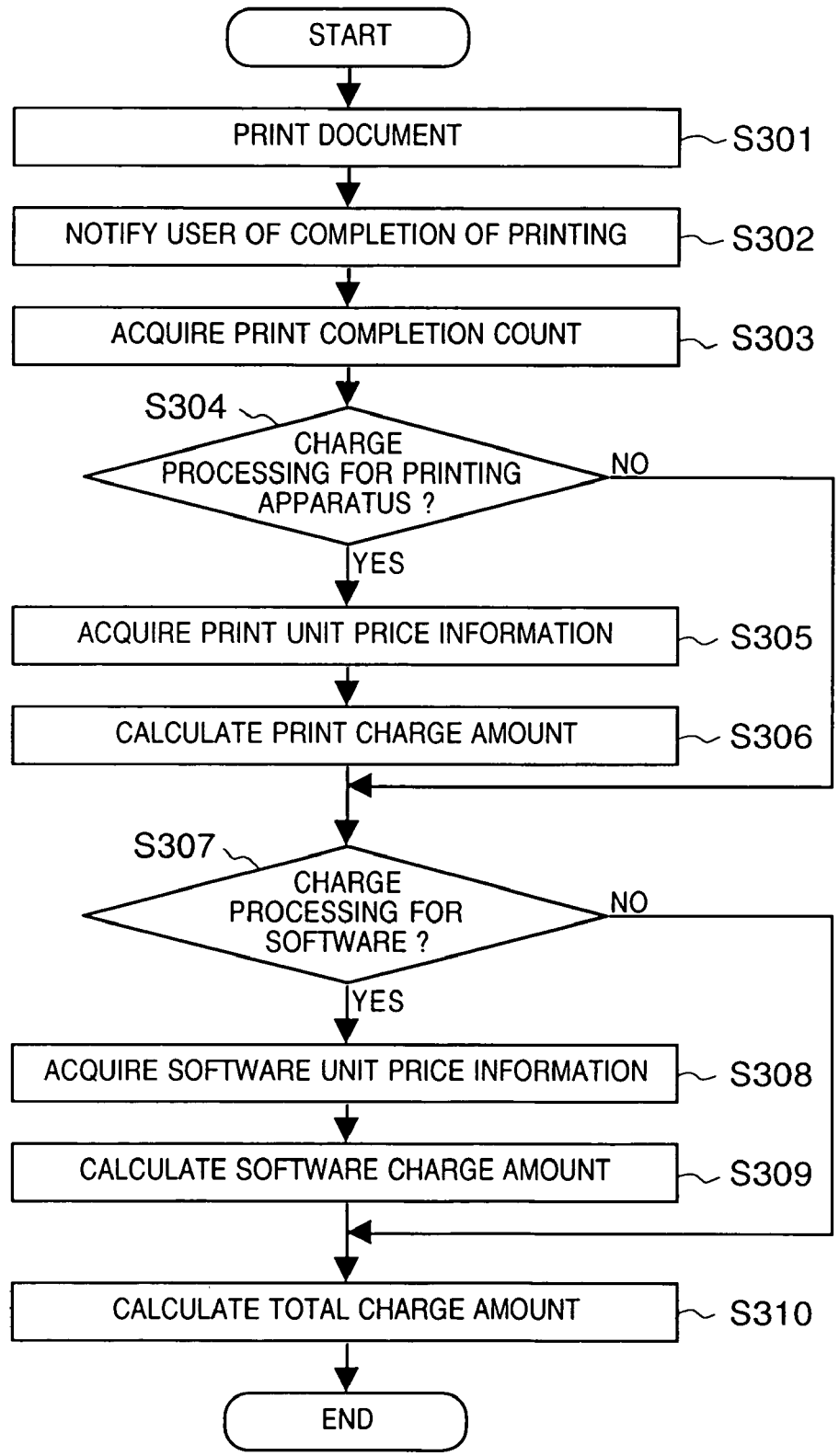
FIG. 3 is a flowchart showing the processing procedure of the first embodiment of the present invention.

Processing of this embodiment having the arrangement shown in FIG. 1 will be described with reference to the flowchart shown in FIG. 3. This flowchart shows print output processing.

First, using application software selected by the user from a plurality of application software in accordance with the purpose, a document to be printed is designed from the keyboard 5 or pointing device 12. The CPU 1 instructs the printer 11 or a printer on the network to print through the printer control section 10 or NIC 13 and causes the printer 11 or printer on the network to print (step S301). Note that the print designation includes designation of an output printer, output range, and the number of output copies.

When the printer prints on the basis of the contents of the print designation in step S301, the printer outputs a request count to the CPU 1 through the printer control section 10 or NIC 13 and notifies the CPU 1 of the output result (step S302).

In step S303, for appropriate charge processing, the CPU 1 acquires the actual number of prints, i.e., the print completion count from the printer 11 or printer on the network. However, if the output device cannot acquire the actual number of prints, the print instruction count designated in step S301 is used as the print completion count.

In step S304, determination is decide on the basis of predetermined information representing whether charge processing for the printer that has printed is to be performed, or whether charge processing is to be performed is displayed on the display device 7 to prompt the user to determine.

If it is determined in step S304 that charge processing for the printer that has printed is not to be executed, the flow advances to step S307.

If it is determined in step S304 that charge processing for the printer that has printed is to be executed, the flow advances to step S305.

In step S305, the print unit price information of the printer that has printed is acquired by looking up a charge table for each output device, which is managed in the computer that has instructed printing or the server on the network.

In step S306, the print charge amount for the printer used for print output is calculated on the basis of the print completion count acquired in step S303 and the print unit price information acquired in step S305.

In step S307, whether charge processing is necessary for the application software and driver software used for print output is determined as in the charge for the printing apparatus. If it is determined that charge processing is to be performed, the flow advances to step S308 to acquire the unit price information of the used application software and driver software from a charge table for each software, which is managed in the computer that has instructed printing or the server on the network. If charge processing is unnecessary, the flow advances to step S310.

To charge for a plurality of software, the total unit price information of the individual software is used as the unit price information of software in step S308.

In step S309, the software charge amount for the software used for print output is calculated on the basis of the print completion count acquired in step S303 and the print unit price information acquired in step S308.

In step S310, to calculate the total charge amount of the print output result, the print charge amount for the printer used for print output and the software charge amount for the software used for print output are added. If the user is not charged for each printing apparatus, the software charge amount calculated in step S308 is obtained as the total charge amount. If the user is not to be charged for software although he or she is charged for the printing apparatus, the charge amount for the printing apparatus is obtained as the total charge amount.

The user is then billed the calculated total charge amount.

The contents of the first embodiment have been described above. The unit price information of the used software is acquired in step S308, and its contents are multiplied by the print completion count acquired in step S303, thereby calculating the charge amount for the software in step S309. However, some software have charge amounts for use of them independently of the print completion count. For such software, the unit price information of the software equals the charge amount for the software.

The present invention is not limited to print output processing described in the above embodiment but can also be effectively applied to software charge processing in another output or input processing.

For example, when different software charge unit prices are set for software capable of loading only monochrome images and software capable of processing full-color images, finer charge management is possible.

(Second Embodiment)

In the first embodiment, charging for a printing apparatus that has printed and charging for application software used for printing have been described. In the second embodiment, charging for use of various input/output devices connected to the information processing apparatus (to be referred to as the computer hereinafter) shown in FIG. 1, input/output devices connected to the computer through a network, various applications stored in the computer, or various applications stored in a server connected through a network and used through the network will be described.

Figure 4:
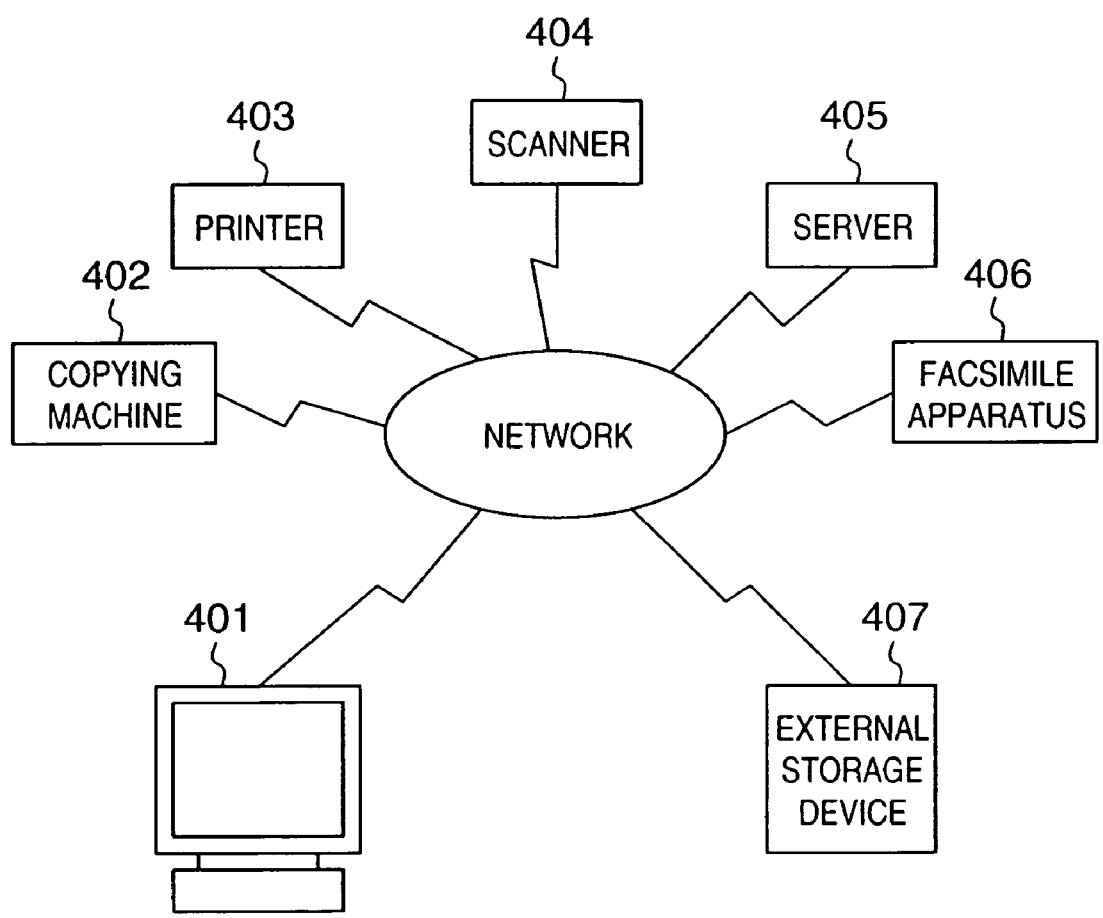
FIG. 4 is a view showing the arrangement of a network system according to the second embodiment of the present invention.

FIG. 4 is a view showing an example in which various devices usable through the computer shown in FIG. 1 or a network are connected to this network.

Referring to FIG. 4, a computer 401 of this embodiment creates or edits a document, or outputs a print instruction or facsimile transmission instruction for the document. The computer 401 can use an application stored in a server or external storage device through a network or read an image from a scanner through network.

A copying machine 402 has not only a copy function but also an image read function as a scanner and a print function as a printer. Reference numeral 403 denotes a printer; 404, a scanner; and 406, a facsimile apparatus. A server 405 stores an application used for document creation or editing and a plurality of applications for use of the scanner, printer, facsimile apparatus, copying machine, and external storage device. An external storage device 407 stores a plurality of applications, like the server.

Figure 5:
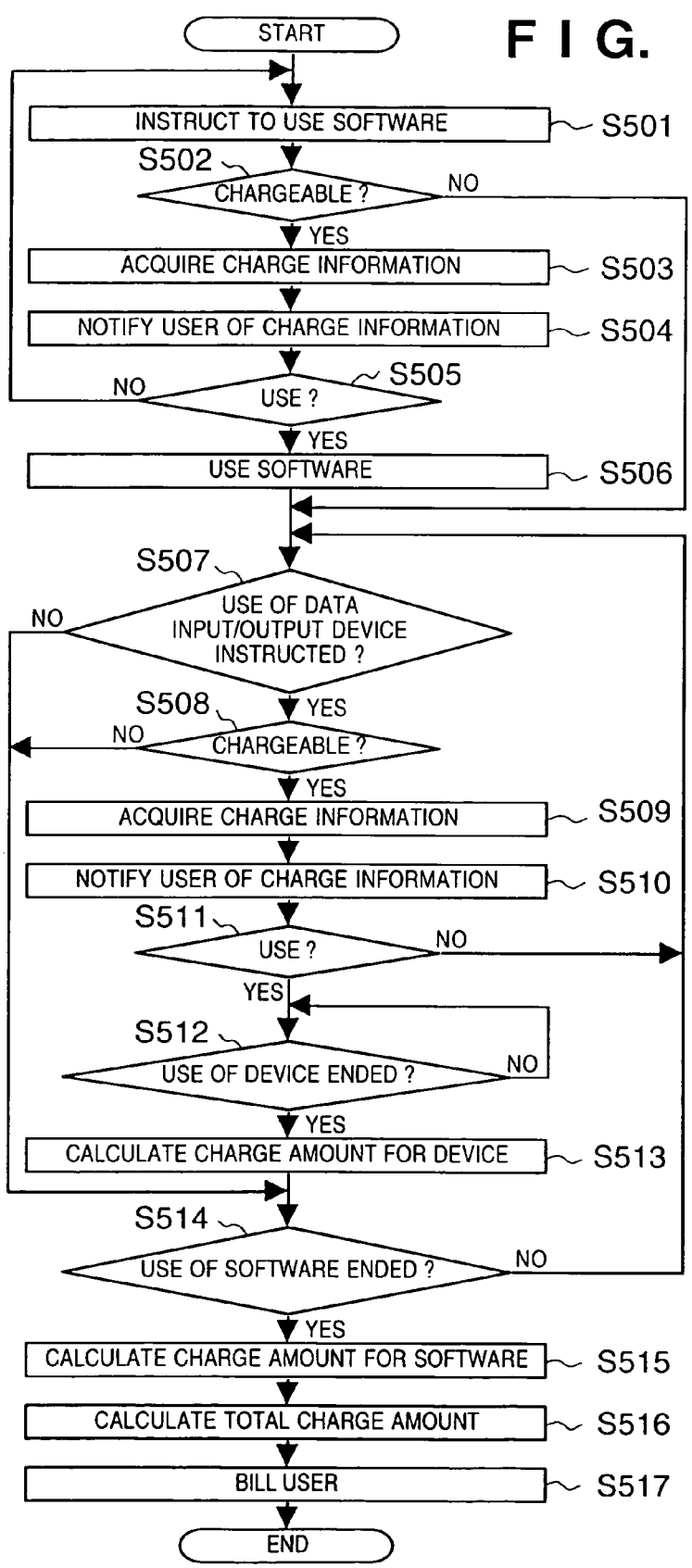
FIG. 5 is a flowchart showing the processing procedure according to the second embodiment of the present invention.

FIG. 5 is a flowchart for explaining the processing of this embodiment.

This embodiment will be described below with reference to FIGS. 4 and 5.

In step S501 shown in FIG. 5, when a use instruction of the application software stored in the computer 401 or application software selected from the plurality of application software stored in the server 405 or external storage device 407 on the network in accordance with the purpose is input from the keyboard or pointing device of the computer, it is determined in step S502 whether the application software incurs any charge. As for this determination, if the designated application software has already been purchased by the user for value, it is determined that the application software does not incur any charge. Application software which is stored in the computer, server 405, or external storage device 407 and for which the user is charged for the use of it is determined chargeable. Furthermore, whether the application software is chargeable or not is held as attribute information by the application software, and is determined by the computer 401 based on the attribute information when the application software is activated.

When it is determined in step S502 that the application software is chargeable, charge information for that application software is acquired in step S503. More specifically, charge information is acquired by referring to the charge information of the designated application software in a charge table for each application software, which is managed in the computer, server 405, or external storage device 407. When the application software for which the use instruction is output is document creation/editing software, the charge information includes pieces of information representing whether all processing operations including creation, editing, printing, and facsimile transmission of a document become available when a predetermined charge is paid, whether the charge need be paid in units of processing operations, whether an additional charge is incurred after the elapse of a predetermined use time, or whether the charge changes depending on the number of printed pages if a print instruction is issued from that application software, whether no limitation is posed on the number of printed pages when a predetermined amount has been paid, or whether the user is separately charged for the printing apparatus and software.

When the application software for which the use instruction is output is software for use of the scanner, the charge information also includes pieces of information representing whether the charge need be paid every time an image is read, whether the number of read images is not limited when a predetermined amount has been paid, and whether the user is separately charged for use of the scanner and use of software.

When the application software for which the use instruction is output is software for use of the facsimile apparatus, the charge information also includes pieces of information representing whether the charge need be paid for each communication, whether the number of times of communication is not limited when a predetermined amount has been paid, and whether the user is separately charged for use of the facsimile apparatus and use of software.

In step S504, the user is notified of the charge information acquired in step S503. In step S505, when the user who has confirmed the notified charge information determines use of the application software, the application software is activated and made available.

When a use instruction for a data input/output device connected to the network, such as the copying machine 402, printer 403, scanner 404, or facsimile apparatus 406, or a data input/output device directly connected to the computer is input in step S507, it is determined in step S508 whether the data input/output device incurs any charge. As for this determination, if the designated device can be used without any charge, or the device charge is already included as the charge for application software, it is determined that the device does not incur any charge. A device for which a charge need be paid independently of the charge for application software is determined chargeable.

When it is determined in step S508 that the designated device is chargeable, charge information related to the device is acquired in step S509. More specifically, charge information is acquired by referring to the charge information of the designated device in a charge table for each data input/output device, which is managed in the computer, server 405, or external storage device 407. When the designated device is the copying machine, the charge information includes pieces of information representing whether the user is charged for each copy, whether no limitation is posed on the number of copies when a predetermined amount has been paid, or the charge for use of only the print function or scanner function of the copying machine.

When the designated device is the printer, the charge information includes pieces of information representing whether the user is charged for each printed page, or whether the number of printed pages is not limited when a predetermined amount has been paid. When the designated device is the scanner, the charge information includes pieces of information representing whether the user is charged for each read image, or whether the number of read images is not limited when a predetermined amount has been paid. When the designated device is the facsimile apparatus, the charge information includes pieces of information representing whether the charge need be paid every time a communication is performed, or whether the number of times of communication is not limited when a predetermined amount has been paid.

In step S510, the user is notified of the charge information acquired in step S509. In step S511, when the user who has confirmed the notified charge information determines use of the device, the flow advances to step S512 to determine whether the use of the device is ended.

When use of the device is ended, the flow advances to step S513 to calculate the amount of charge for use of the device on the basis of the charge information acquired in step S509. If use of application software is also ended in step S514, the flow advances to step S515 to calculate the amount of charge for the application software on the basis of the charge information acquired in step S503. In step S516, the total charge amount including the charge amount of the application software and that of the data input/output device is calculated. In step S517, the user is billed that amount.

As described above, according to this embodiment, charges for not only application software stored in the computer but also various application software provided through the network can be calculated independently of the charge for the device.

As described above, according to this embodiment, when the charge unit price of application software is set in consideration of the function or price of application software used for various data processing operations, not only the charge amount for use of the device but also the charge amount for the application software used can be calculated, so finer charge management can be implemented.

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiments to a system or apparatus, and causing the computer (or a CPU or an MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magneto optical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

What is claimed is:

1. A charge calculation apparatus comprising:
   a first determination unit configured to determine whether or not application software, which is selected from application software provided by another apparatus connected via a network and used via the network, is an accounting object, wherein the selected application software is used to create and/or edit data by a user operation via the network;
   a first calculation unit configured to calculate a software charge for performing a predetermined process by using the selected application software, in accordance with determination by said first determination unit;
   a second determination unit configured to determine whether or not an output device, which is selected from a plurality of output devices to receive via the network the data created and/or edited by the selected application software and to output the data, is an accounting object;
   a second calculation unit configured to calculate a device charge for using the selected output device, in accordance with determination by said second determination unit; and
   a third calculation unit configured to calculate a total charge of a data output process based on the respective charges calculated by said first and second calculation unit.

2. The apparatus according to claim 1, wherein the application software creates and/or edits document data.

3. A charge calculation apparatus comprising:
   a first determination unit configured to determine whether or not a device, which is selected from a plurality of devices to input or output data, is an accounting object, wherein the selected device is used by a user via a network;
   a first calculation unit configured to calculate a device charge for using the selected device in accordance with determination by said first determination unit;
   a second determination unit configured to determine whether or not application software, which is used to use the selected device via the network, is an accounting object;
   a second calculation unit configured to calculate a software charge for using the application software in accordance with determination by said second determination unit; and
   a third calculation unit configured to calculate a data processing charge of the selected device using the application software based on the respective charges calculated by said first and second calculation units.

4. The apparatus according to claim 3, wherein the application software is stored in said charge calculation apparatus.

5. The apparatus according to claim 3, wherein the application software is provided through a network.

6. A charge calculation method comprising:
   a first determination step of determining whether or not application software, which is selected from application software provided by another apparatus connected via a network and used via the network, is an accounting object, wherein the selected application software is used to create and/or edit data by a user operation via the network;
   a first calculation step of calculating a software charge for performing a predetermined process by using the selected application software, in accordance with determination in said first determination step;
   a second determination step of determining whether or not an output device, which is selected from a plurality of output devices to receive via the network the data created and/or edited by the selected application software and to output the data, is an accounting object;
   a second calculation step of calculating a device charge for using the selected output device, in accordance with determination in said determination step; and
   a third calculation step of calculating a total charge of a data output process based on the respective charges calculated in said first and second calculation step.

7. The method according to claim 6, wherein the application software creates and/or edits document data.

8. A charge calculation method comprising:
   a first determination step of determining whether or not a device, which is selected from a plurality of devices to input or output data, is an accounting object, wherein the selected device is used by a user via a network;

a first calculation step of calculating a device charge for using the selected device in accordance with determination in said first determination step;

a second determination step of determining whether or not application software, which is used to use the selected device via the network, is an accounting object;

a second calculation step of calculating a software charge for using the application software in accordance with determination in said second determination step; and a third calculation step of calculating a data processing charge of the selected device using the application software based on the respective charges calculated in said first and second calculation step.

9. The method according to claim 8, wherein the application software is stored in a computer.

10. The method according to claim 8, wherein the application software is provided through a network.

11. A computer-readable storage medium which stores program codes of a charge calculation method, comprising:

a code of a first determination step of determining whether or not application software, which is selected from application software provided by another apparatus connected via a network and used via the network, is an accounting object, wherein the selected application software is used to create and/or edit data by a user operation via the network;

a code of a first calculation step of calculating a software charge for performing a predetermined process by using the selected application software, in accordance with determination in said first determination step;

a code of a second determination step of determining whether or not an output device, which is selected from a plurality of output devices to receive via the network the data created and/or edited by the selected application software and to output the data, is an accounting object;

a code of a second calculation step of calculating a device charge for using the selected output device, in accordance with determination in said second determination step; and a code of a third calculation step of calculating a total charge of a data output process based on the respective charges calculated in said first and second calculation step.

12. A computer-readable storage medium which stores program codes of a charge calculation method, comprising:

a code of a first determination step of determining whether or not a device, which is selected from a plurality of devices to input or output data, is an accounting object, wherein the selected device is used by a user via a network;

a code of a first calculation step of calculating a device charge for using the selected device in accordance with determination in said first determination step;

a second determination step of determining whether or not application software, which is used to use the selected device via the network, is an accounting object;

a code of a second calculation step of calculating a software charge for using the application software in accordance with determination in said second determination step; and a code of a third calculation step of calculating a data processing charge of the selected device using the application software based on the respective charges calculated in said first and second calculation step.

* * * * *

UNITED STATES PATENT AND TRADEMARK OFFICE
CERTIFICATE OF CORRECTION

PATENT NO.       : 7,072,866 B1
APPLICATION NO.  : 09/648870
DATED            : July 4, 2006
INVENTOR(S)      : Hiroyuki Hara It is certified that error appears in the above-identified patent and that said Letters Patent is hereby corrected as shown below:

Column 3, line 14, delete "operating system 13" and insert --operating system--

Signed and Sealed this

Seventh Day of November, 2006

JON W. DUDAS
*Director of the United States Patent and Trademark Office*